United States Patent
Lee et al.

(10) Patent No.: US 8,720,190 B2
(45) Date of Patent: May 13, 2014

(54) METHOD FOR PREDICTING SOX STORED AT DENOX CATALYST AND EXHAUST SYSTEM USING THE SAME

(75) Inventors: Jin Ha Lee, Seoul (KR); Jin Woo Park, Suwon (KR); Christopher Severin, Aachen (DE); Thomas Wittka, Aachen (DE)

(73) Assignees: Hyundai Motor Company, Seoul (KR); Kia Motors Corporation, Seoul (KR); FEV Motorentechnik GmbH, Aachen (DE)

( * ) Notice: Subject to any disclaimer, the term of this patent is extended or adjusted under 35 U.S.C. 154(b) by 263 days.

(21) Appl. No.: 13/232,609

(22) Filed: Sep. 14, 2011

(65) Prior Publication Data

US 2012/0137662 A1    Jun. 7, 2012

(30) Foreign Application Priority Data

Dec. 2, 2010    (KR) .................. 10-2010-0122245

(51) Int. Cl.
    *F01N 3/00*    (2006.01)
(52) U.S. Cl.
    USPC ............ 60/286; 60/276; 60/282; 60/295; 60/297; 60/299
(58) Field of Classification Search
    USPC ................................. 60/273–324
    See application file for complete search history.

(56) References Cited

U.S. PATENT DOCUMENTS

| | | | |
|---|---|---|---|
| 6,829,885 B2 | 12/2004 | Surnilla et al. | |
| 2004/0031261 A1 | 2/2004 | Sun et al. | |
| 2005/0251318 A1* | 11/2005 | Wickert et al. | 701/108 |
| 2009/0000274 A1 | 1/2009 | Stroh | |
| 2009/0044516 A1* | 2/2009 | Gabe et al. | 60/281 |
| 2009/0044518 A1* | 2/2009 | Frouvelle et al. | 60/286 |
| 2009/0165758 A1 | 7/2009 | Nishiumi et al. | |
| 2011/0099976 A1 | 5/2011 | Park | |

FOREIGN PATENT DOCUMENTS

| | | |
|---|---|---|
| JP | 2003-314328 A | 11/2003 |
| JP | 2004-324566 A | 11/2004 |
| JP | 2005-240682 A | 9/2005 |
| JP | 3903977 B2 | 1/2007 |
| JP | 4089690 B2 | 3/2008 |
| JP | 2009-209898 A | 9/2009 |
| KR | 10-0592414 B1 | 6/2006 |
| KR | 10-2007-0062207 A | 6/2007 |

* cited by examiner

*Primary Examiner* — Thomas Denion
*Assistant Examiner* — Philip Eklem
(74) *Attorney, Agent, or Firm* — Morgan, Lewis & Bockius LLP

(57) ABSTRACT

A method for predicting sulfur oxides (SOx) stored at a denitrification (DeNOx) catalyst may include calculations of the mass flow of SOx poisoned at the DeNOx catalyst, the mass flow of SOx released from the DeNOx catalyst, and the SOx amount poisoned at the DeNOx catalyst by integrating the value obtained by subtracting the released mass flow of SOx from the poisoned mass flow of SOx. An exhaust system using the method may comprise an engine having a first injector, an exhaust pipe, a second injector mounted at the exhaust pipe and injecting a reducing agent, a DeNOx catalyst mounted at the exhaust pipe and reducing SOx or nitrogen oxides (NOx) or both contained in the exhaust gas by using the reducing agent, and a control portion electrically connected to the system and performing the calculations and controls.

8 Claims, 5 Drawing Sheets

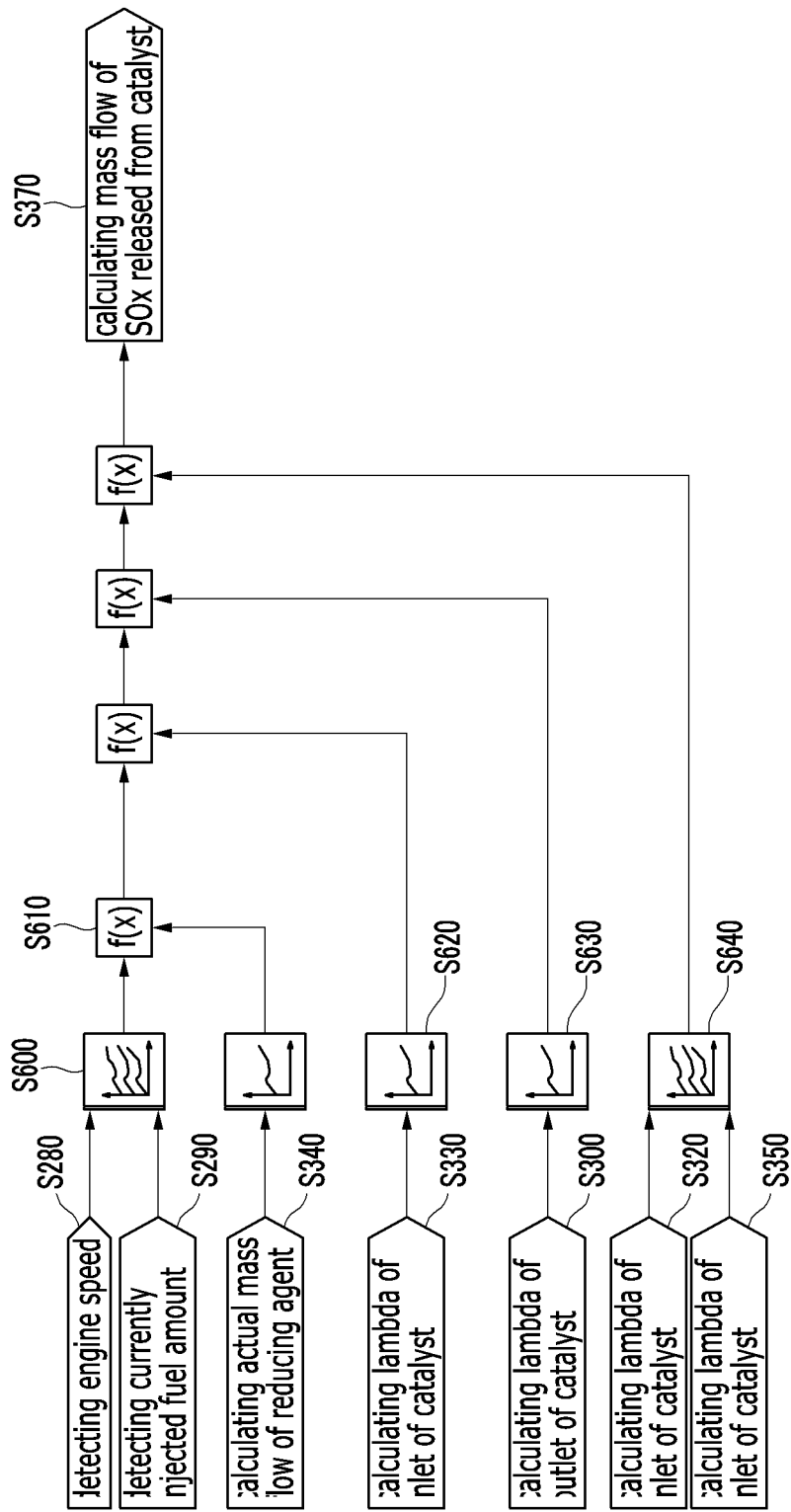

METHOD FOR PREDICTING SOX STORED AT DENOX CATALYST AND EXHAUST SYSTEM USING THE SAME

CROSS-REFERENCE TO RELATED APPLICATION

The present application claims priority of Korean Patent Application Number 10-2010-0122245 filed in the Korean Intellectual Property Office on Dec. 2, 2010, the entire contents of which application is incorporated herein for all purposes by this reference.

BACKGROUND OF THE INVENTION

1. Field of Invention

The present invention relates to a method for predicting the amount of sulfur oxides (Sox) stored at a denitrification (DeNOx) catalyst and an exhaust system using the same. More particularly, the present invention relates to a method for precisely predicting the SOx amount actually stored at the DeNOx catalyst and to an exhaust system which controls the regeneration timing of the DeNOx catalyst and the amount of reducing agent which is to be injected by using the method.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matters (PM) contained in the exhaust gas is mounted in the exhaust pipe.

A denitrification catalyst (DeNOx catalyst) is one type of such a catalytic converter and purifies nitrogen oxides (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst absorbs the NOx contained in the exhaust gas when the engine operates in a lean atmosphere, and releases the absorbed NOx when the engine operates in a rich atmosphere. The release of the absorbed NOx from the LNT catalyst is called regeneration.

Since materials absorbing the NOx at the DeNOx catalyst, however, are alkaline materials, SOx (materials which are made by oxidizing sulfur components contained in a fuel or an engine oil) as well as NOx contained in the exhaust gas is also absorbed. Sulfur poisoning of the DeNOx catalyst deteriorates purification efficiency of the DeNOx catalyst. Accordingly, desulfurization processes for the DeNOx catalyst is necessary.

If SOx amount poisoned at the DeNOx catalyst is greater than or equal to a predetermined amount, the engine is controlled to enter desulfurization mode so as to release the SOx poisoned in the DeNOx catalyst according to a conventional desulfurization method for an exhaust system. At this time, since the driving state of the engine, the temperature of the exhaust gas, the lambdas of inlet and outlet of the DeNOx catalyst should be considered, a lot of engine control unit (ECU) memories may be necessary and processing speed may be slow In addition, temperature difference between the inlet and outlet of the DeNOx catalyst is large when desulfurization. It is difficult to select a reference temperature for desulfurization and a great many variables and maps are required.

Therefore, desulfurization is controlled by using the inlet temperature and lambdas of the DeNOx catalyst while neglecting changes in the driving state of the engine. Accordingly, aging of the DeNOx catalyst and fuel economy may be deteriorated.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide a method for predicting the SOx stored at a DeNOx catalyst having advantages of precisely predicting the SOx amount actually stored at the DeNOx catalyst by defining the optimal temperature of the DeNOx catalyst, the optimal volume speed of exhaust gas passing through the DeNOx catalyst, the optimal lambda of an inlet of the DeNOx catalyst, and the optimal mass flow of a reducing agent.

Various aspects of the present invention have been made in a further effort to provide an exhaust system having advantages of precisely determining the regeneration timing of the DeNOx catalyst and the injection amount of the reducing agent based on precisely predicted SOx storage amount.

An exemplary method for predicting the SOx stored at a DeNOx catalyst according to the present invention may include: calculating the mass flow of SOx poisoned at the DeNOx catalyst at the current driving state of a vehicle; calculating the mass flow of SOx released from the DeNOx catalyst at the current driving state of the vehicle; and calculating the SOx amount poisoned at the DeNOx catalyst by integrating a value obtained by subtracting the mass flow of SOx released from the DeNOx catalyst from the mass flow of SOx poisoned at the DeNOx catalyst.

The mass flow of SOx poisoned at the DeNOx catalyst may be calculated based on the mass flow of SOx in an exhaust gas, the volume speed of the exhaust gas passing through the DeNOx catalyst, the temperature of the DeNOx catalyst, and the SOx amount currently stored at the DeNOx amount.

Calculation of the mass flow of SOx poisoned at the DeNOx catalyst may include: calculating the SOx storing capacity per volume according to the temperature of the DeNOx catalyst; calculating the current SOx storing capacity by using the SOx storing capacity per volume and the effective volume of the DeNOx catalyst; calculating the relative SOx storing level by using the current SOx storing capacity and the currently stored SOx amount; calculating the reference SOx storing efficiency according to the relative SOx storing level; and calculating the mass flow of SOx stored at the DeNOx catalyst by using the reference SOx storing efficiency and the mass flow of SOx in the exhaust gas.

The reference SOx storing efficiency may be corrected according to the volume speed of the exhaust gas passing through the DeNOx catalyst and the temperature of the DeNOx catalyst.

The mass flow of SOx released from the DeNOx catalyst may be calculated based on the lambda of an inlet of the DeNOx catalyst, the actual mass flow of reducing agent, the engine speed, the current fuel injection amount, the lambda of an outlet of the DeNOx catalyst, the currently stored SOx amount, and the temperature of the DeNOx catalyst.

Calculation of the mass flow of SOx released from the DeNOx catalyst may include: calculating the release efficiency according to the engine speed and the current fuel injection amount; calculating the reference SOx releasing mass flow by using the release efficiency and the mass flow of the reducing agent; and calculating the mass flow of SOx released from the DeNOx catalyst by correcting the reference SOx releasing mass flow.

The reference SOx releasing mass flow may be corrected by using at least one of a first correction coefficient according to the lambda of the inlet of the DeNOx catalyst, a second correction coefficient according to the lambda of the outlet of the DeNOx catalyst, and a third correction coefficient according to the temperature of the DeNOx catalyst and the currently stored. SOx amount.

The method may further include calculation of the SOx amount removed from the DeNOx catalyst by integrating the mass flow of SOx released from the DeNOx catalyst.

An exemplary exhaust system according to the present invention may include: an exhaust pipe through which an exhaust gas flows, the exhaust gas being generated at an engine having a first injector injecting a fuel into a combustion chamber; a second injector mounted at the exhaust pipe and injecting a reducing agent; a DeNOx catalyst mounted at the exhaust pipe downstream of the second injector and reducing SOx or nitrogen oxides (NOx) or both contained in the exhaust gas by using the reducing agent injected by the second injector; and a control portion predicting the SOx amount stored at the DeNOx catalyst and the SOx amount removed from the DeNOx catalyst according to the driving state of the engine, wherein the control portion calculates the mass flow of SOx poisoned at the DeNOx catalyst based on the mass flow of SOx in the exhaust gas, the volume speed of the exhaust gas passing through the DeNOx catalyst, the temperature of the DeNOx catalyst, and the currently stored SOx amount, and calculates the mass flow of SOx released from the DeNOx catalyst based on the lambda of an inlet of the DeNOx catalyst, the actual mass flow of the reducing agent, the engine speed, the current fuel injection amount, the lambda of an outlet of the DeNOx catalyst, the currently stored SOx, and the temperature of the DeNOx catalyst.

The control portion may calculate the SOx amount poisoned at the DeNOx catalyst by integrating a value obtained by subtracting the mass flow of SOx released from the DeNOx catalyst from the mass flow of SOx poisoned at the DeNOx catalyst.

The control portion may calculate the SOx amount removed from the DeNOx catalyst by integrating the mass flow of SOx released from the DeNOx catalyst.

The control portion may calculate the SOx storing capacity per volume according to the temperature of the DeNOx catalyst, may calculate the current SOx storing capacity by using the SOx storing capacity per volume and the effective volume of the DeNOx catalyst, may calculate the relative SOx storing level by using the current SOx storing capacity and the currently stored SOx amount, may calculate the reference SOx storing efficiency according to the relative SOx storing level, and may calculate the mass flow of SOx stored at the DeNOx catalyst by using the reference SOx storing efficiency and the mass flow of SOx in the exhaust gas.

The reference SOx storing efficiency may be corrected according to the volume speed of the exhaust gas passing through the DeNOx catalyst and the temperature of the DeNOx catalyst.

The control portion may calculate the release efficiency according to the engine speed and the current fuel injection amount, may calculate the reference SOx releasing mass flow by using the release efficiency and the mass flow of the reducing agent, and may calculate the mass flow of released SOx by correcting the reference SOx releasing mass flow.

The reference SOx releasing mass flow may be corrected by using at least one of a first correction coefficient according to the lambda of the inlet of the DeNOx catalyst, a second correction coefficient according to the lambda of the outlet of the DeNOx catalyst, and a third correction coefficient according to the temperature of the DeNOx catalyst and the currently stored SOx.

The reducing agent may be a fuel.

The exhaust system may further include a fuel cracking catalyst disposed at the exhaust pipe between the second injector and the DeNOx catalyst and decomposing the fuel.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart for calculating the mass flow of SOx released from a DeNOx catalyst according to an exemplary method of the present invention.

Figure 1:
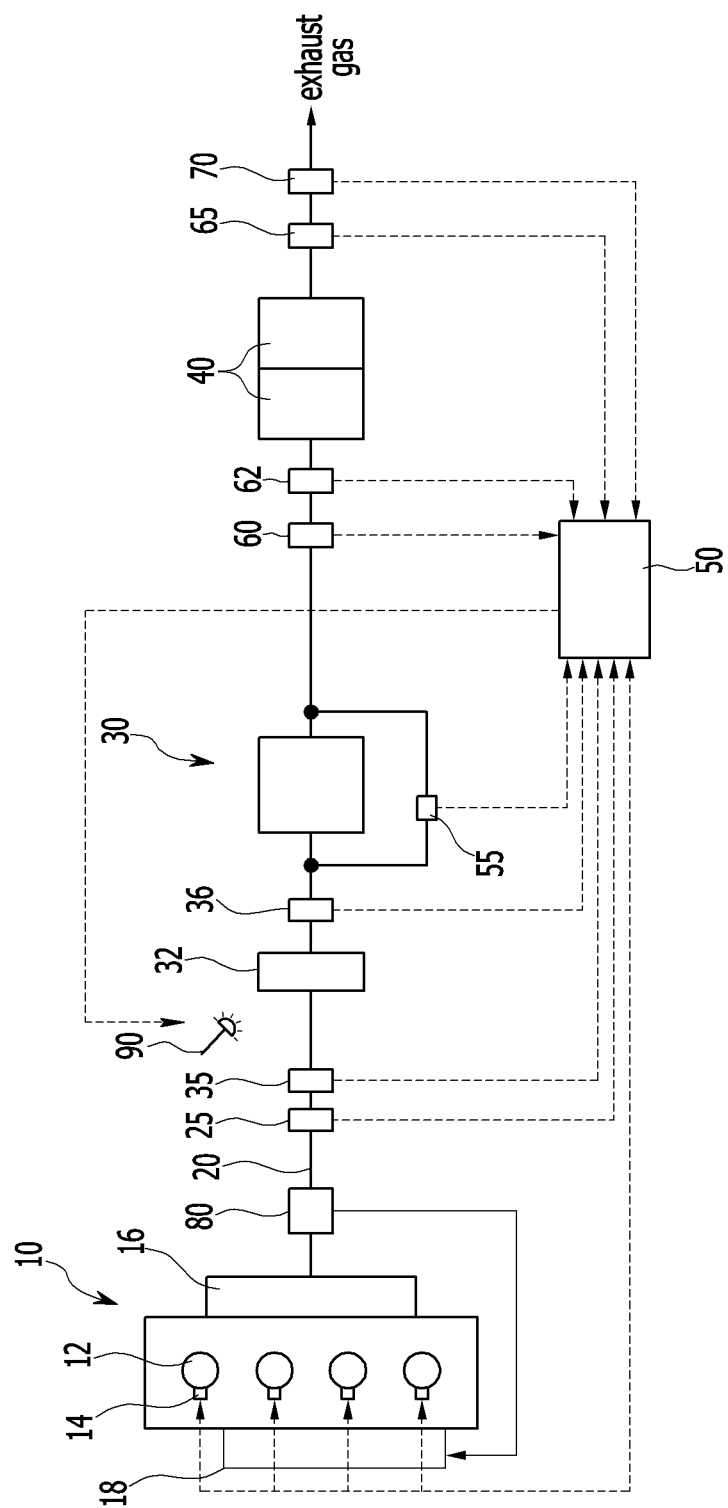
FIG. 1 is a schematic diagram of an exemplary exhaust system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIG. 1, an exemplary exhaust system for an internal combustion engine may include an engine 10, an exhaust pipe 20, an exhaust gas recirculation (EGR) apparatus 80, a fuel cracking catalyst 32, a particulate filter 30, a DeNOx catalyst 40, and a control portion 50.

The engine 10 burns an air-fuel mixture in which fuel and air are mixed so as to convert chemical energy into mechanical energy. The engine 10 is connected to an intake manifold 18 so as to receive the air in a combustion chamber 12, and is connected to an exhaust manifold 16 such that exhaust gas generated in a combustion process is gathered in the exhaust manifold 16 and is exhausted to the exterior. A first injector 14 is mounted in the combustion chamber 12 so as to inject the fuel into the combustion chamber 12.

A diesel engine is exemplified herein, but a lean-burn gasoline engine may be used. In a case that the gasoline engine is used, the air-fuel mixture flows into the combustion chamber 12 through the intake manifold 18, and a spark plug is mounted at an upper portion of the combustion chamber 12. In various embodiments, an engine having various compression ratios may be used with a compression ratio lower than or equal to 16.5.

The exhaust pipe 20 is connected to the exhaust manifold 16 so as to exhaust the exhaust gas to the exterior of a vehicle. The particulate filter 30 and the DeNOx catalyst 40 are mounted at the exhaust pipe 20 so as to remove HC, CO, particulate matters (PM), NOx, and other matters contained in the exhaust gas.

The exhaust gas recirculation apparatus 80 is mounted at the exhaust pipe 20, and the exhaust gas exhausted from the engine 10 passes through the exhaust gas recirculation apparatus 80. In addition, the exhaust gas recirculation apparatus 80 is connected to the intake manifold 18 so as to control the combustion temperature by mixing a portion of the exhaust gas with the air. Such control of the combustion temperature is performed by controlling the amount of the exhaust gas supplied to the intake manifold 18 by control of the control portion 50.

A first oxygen sensor 25 is mounted at the exhaust pipe 20 downstream of the exhaust gas recirculation apparatus 80, and detects oxygen amount in the exhaust gas passing through the exhaust gas recirculation apparatus 80. In this specification, the detected value by the first oxygen sensor is called a lambda of an engine outlet.

The second injector 90 is mounted at the exhaust pipe 20 downstream of the exhaust gas recirculation apparatus 80, is electrically connected to the control portion 50, and performs additional injection of fuel into the exhaust pipe 20 according to control of the control portion 50.

The particulate filter 30 is mounted at the exhaust pipe 20 downstream of the second injector 90. A fuel cracking catalyst is provided at upstream of the particulate filter 30. In this case, the fuel cracking catalyst 32 is disposed between the second injector 90 and the DeNOx catalyst 40. Herein, the fuel cracking catalyst 32 is provided separately from the particulate filter 30 as an example, but the fuel cracking catalyst 32 may be coated at the front portion of the particulate filter 30.

The fuel cracking catalyst 32 breaks down the chain of carbon compounds contained in the fuel through the catalyst reaction so as to decompose the carbon compounds. That is, the fuel cracking catalyst 32 breaks down the chain constituting hydrocarbon and decomposes the fuel through thermal cracking. Therefore, the effective reaction area of the additionally injected fuel increases, and thereby hydrocarbon including high-reactivity oxygenated HC, CO, and H2 are produced. Herein, the hydrocarbon represents all compounds comprising of carbon and hydrogen contained in the exhaust gas and the fuel.

Examples of thermal cracking proceed as follows.

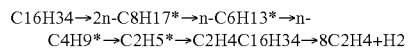

Here, * means a radical.

A particulate matter filtering device 30 which is one type of the particulate filter 30 is mounted at the downstream of the fuel cracking catalyst 32, and traps particulate matters (PM) contained in the exhaust gas exhausted through the exhaust pipe 20. In this specification, the particulate matter filtering device 30 is used as an example of the particulate filter 30. However, other types of particulate filter 30 such as a catalyst particulate filter (CPF) may be used instead of using the particulate matter filtering device 30.

In addition, an oxidizing catalyst may be coated at the particulate filter 30. Such an oxidizing catalyst oxidizes HC and CO contained in the exhaust gas into CO2, and oxidizes NO contained in the exhaust gas into NO2. The oxidizing catalyst may be coated mainly at a specific region of the particulate filter 30 or may be coated uniformly at an entire region of the particulate filter 30.

A first temperature sensor 35 is mounted at the exhaust pipe 20 upstream of the fuel cracking catalyst 32, and detects an inlet temperature of the fuel cracking catalyst 32. A second temperature sensor 36 is mounted at downstream of the fuel cracking catalyst 32, and detects an outlet temperature of the fuel cracking catalyst 32 or an inlet temperature of the particulate filter 30.

Meanwhile, a pressure difference sensor 55 is mounted at the exhaust pipe 20. The pressure difference sensor 55 detects a pressure difference between an inlet and an outlet of the particulate filter 30, and transmits a signal corresponding thereto to the control portion 50. The control portion 50 controls the particulate filter 30 to be regenerated when the pressure difference detected by the pressure difference sensor 55 is higher than or equal to a first predetermined pressure. In this case, the first injector 14 can post-inject fuel so as to burn the PM trapped in the particulate filter 30. Similarly, the second injector 90 can additionally inject the fuel so as to regenerate the particulate filter 30.

The DeNOx catalyst 40 is mounted at the exhaust pipe 20 downstream of the particulate filter 30. The DeNOx catalyst 40 absorbs the NOx contained in the exhaust gas, and releases the absorbed NOx by the additional injection of the fuel. In addition, the DeNOx catalyst 40 performs a reduction reaction of the released NOx so as to purify the NOx contained in the exhaust gas.

A third temperature sensor 60 and a fourth temperature sensor 65 are mounted respectively at the upstream and downstream of the DeNOx catalyst 40 so as to detect an inlet temperature and an outlet temperature of the DeNOx catalyst 40. Herein, the DeNOx catalyst 40 is divided into multiple parts, and in various embodiments, preferably two parts. The reason for the division is that metal ratio coated at each part may be changed so as to perform a specific function. For example, heat-resisting ability of a first part 40 close to the engine 10 is strengthened by increasing palladium (Pd) ratio, and slip of hydrocarbon from a second part 40 is prevented by increasing platinum (Pt) ratio. However, the DeNOx catalyst 40 in which the same metal ratio is coated at an entire region may be used.

In addition, a second oxygen sensor 62 is mounted at the exhaust pipe 20 upstream of the DeNOx catalyst 40 and a third oxygen sensor 70 is mounted at the exhaust pipe 20 downstream of the DeNOx catalyst 40. The second oxygen sensor 62 detects oxygen amount contained in the exhaust gas flowing into the DeNOx catalyst 40 and transmits a signal corresponding thereto to the control portion 50 so as to help the control portion 50 perform lean/rich control of the exhaust gas. In addition, the third oxygen sensor 70 is used for monitoring whether the exemplary exhaust systems for an internal combustion engine according to the present invention effectively purifies noxious materials contained in the exhaust gas. Herein, it is exemplary described in this specification that the second oxygen sensor 62 is additionally mounted at the exhaust pipe 20. However, instead of additionally mounting the second oxygen sensor 62 at the exhaust pipe 20, the oxygen amount contained in the exhaust gas flowing into the DeNOx catalyst 40 may be estimated based on at least one of detected values of the first oxygen sensor 25 and the third oxygen sensor 70, fuel consumption, and engine operating history. In this specification, the detected value by the second oxygen sensor 62 is called a lambda of an inlet of the DeNOx catalyst.

The control portion 50 determines the driving condition of an engine based on signals transmitted from each sensor, and controls additional injection amount and additional injection timing of the fuel based on the driving condition of the engine. Thereby, the control portion 50 controls the DeNOx catalyst 40 to release the absorbed NOx. For example, in a case that NOx amount absorbed in the DeNOx catalyst 40 is larger than or equal to a predetermined value, the control portion 50 controls the additional injection of the fuel.

In addition, the control portion 50 controls the ratio of the HC to the NOx in the exhaust gas. If the ratio is larger than or equal to a predetermined ratio, the control portion 50 activates the reduction reaction of the NOx in the DeNOx catalyst 40. The predetermined ratio may be 5.

Meanwhile, the control portion 50 calculates the NOx amount stored in the DeNOx catalyst 40, the slip amount of the NOx from a rear portion of the DeNOx catalyst 40, and the ratio of the HC to the NOx based on the driving condition of the engine. Such calculation is done according to a map table defined by various experiments.

In addition, the control portion 50 changes injection patterns of the fuel injected by the second injector 90 according to the driving condition of the engine, the state of the engine, or the state of the DeNOx catalyst 40. Here, the state of the engine is assumed by considering the operating period of the engine, and the state of the DeNOx catalyst 40 is assumed by considering the aging of the DeNOx catalyst 40.

In addition, the control portion 50 controls the first injector 14 and the second injector 90 so as to additionally inject the fuel when SOx amount poisoned at the DeNOx catalyst 40 is larger than or equal to a predetermined amount. In this case, SOx poisoned at the DeNOx catalyst 40 is removed by additionally injected fuel. Removal of SOx poisoned at the DeNOx catalyst 40 by additionally injected fuel is called desulfurization or regeneration of the DeNOx catalyst 40. Therefore, the regeneration of the DeNOx catalyst 40 means that any of NOx or SOx or other noxious materials absorbed at the DeNOx catalyst 40 is released in this specification.

Further, the control portion 50 performs the regeneration of the particulate filter 30.

Meanwhile, the control portion 50 may control the first injector 14 to post-inject the fuel so as to activate the reduction reaction of the NOx in the DeNOx catalyst 40 instead of additional injection of the second injector 90. In this case, the post-injected fuel is converted into high-reactivity reducing agent at the fuel cracking catalyst 32, and promotes the reduction reaction of the NOx in the DeNOx catalyst 40. Therefore, it is to be understood that the additional injection includes the post-injection in this specification and the claim sets.

In this specification, an LNT catalyst is used as an example of the DeNOx catalyst 40, but the DeNOx catalyst 40 is not limited thereto.

Hereinafter, an exemplary embodiment of the DeNOx catalyst 40 will be described in detail.

The DeNOx catalyst 40 includes multiple layers coated on a carrier, preferably first and second catalyst layers in various embodiments. The first catalyst layer is disposed close to the exhaust gas, and the second catalyst layer is disposed close to the carrier.

The first catalyst layer oxidizes the NOx contained in the exhaust gas, and reduces a portion of the oxidized NOx through oxidation-reduction reaction with the HC contained in the unburned fuel or the exhaust gas. In addition, the remaining portion of the oxidized NOx is diffused into the second catalyst layer.

The second catalyst layer absorbs the NOx diffused from the first catalyst layer, and releases the absorbed NOx by additionally injected fuel such that the absorbed NOx is reduced at the first catalyst layer. The NOx diffused to the second catalyst layer is absorbed at the second catalyst layer as a nitrate (NO3-) type. In addition, the NOx released from the second catalyst layer is changed into NO2 type and moves to the first catalyst layer. A portion of the NO2 is reduced, a portion of the NO2 slips, and the remaining portion of the NO2 is absorbed at the first catalyst layer.

The second catalyst layer includes an adsorption material. Weak alkaline oxides are used as such an adsorption material. Oxides containing alkali metals or alkali earth metals are used as the weak alkaline oxides, and more particularly oxides containing barium may be used as the weak alkaline oxides.

Hereinafter, the operation of an exemplary DeNOx catalyst 40 will be described in detail.

In a case that the fuel is not additionally injected from the second injector 90, the NOx contained in the exhaust gas is oxidized in the first catalyst layer. A portion of the oxidized NOx is reduced into N2 through the oxidation-reduction reaction with the HC contained in the exhaust gas. At this stage, the HC contained in the exhaust gas is oxidized into CO2. In addition, the remaining portion of the oxidized NOx and the NOx contained in the exhaust gas are diffused into the second catalyst layer and are absorbed therein.

In a case that the fuel is additionally injected from the second injector 90, the additionally injected fuel passes through the fuel cracking catalyst, and the fuel is converted into the HC of the low molecule at this time. In addition, the portion of the HC of the low molecule is converted into the oxygenated HC and passes through the DeNOx catalyst 40.

At this time, the NOx is released from the second catalyst layer through the substituted reaction with the HC. In addition, the NOx is reduced into the N2 and the HC and the oxygenated HC are oxidized into the CO2 in the first catalyst layer through the oxidation-reduction reaction of the released NOx with the HC and the oxygenated HC. Therefore, the NOx and the HC contained in the exhaust gas are purified.

Figure 2:
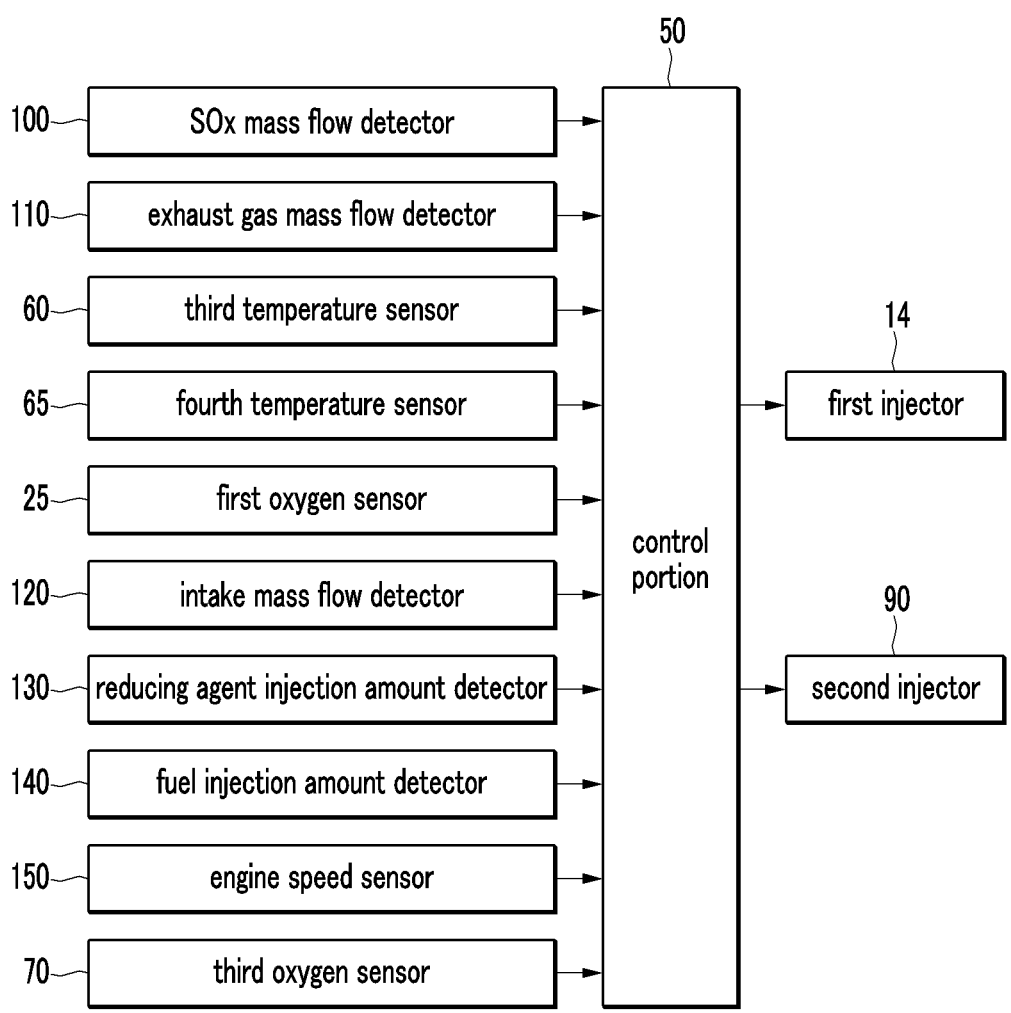
FIG. 2 is a block diagram showing the relationship of an input and output of an exemplary control portion according to the present invention.

FIG. 2 is a block diagram showing the relationship of an input and output of a control portion used in a method for predicting SOx stored at a DeNOx catalyst according to an exemplary embodiment of the present invention.

As shown in FIG. 2, a SOx mass flow detector 100, an exhaust gas mass flow detector 110, the third temperature sensor 60, the fourth temperature sensor 65, the first oxygen sensor 25, an intake mass flow detector 120, a reducing agent injection amount detector 130, a fuel injection amount detector 140, an engine speed sensor 150, and the third oxygen sensor 70 are electrically connected to the control portion 50, and detected values thereof are transmitted to the control portion 50.

The SOx mass flow detector 100 detects the mass flow of SOx contained in the exhaust gas passing through the inlet of the DeNOx catalyst 40. Typically, the control portion 50 predicts the mass flow of SOx contained in the exhaust gas by taking into account the combustion state of the air-fuel mixture, the temperature of the exhaust gas, the lambda of the outlet of the engine, the lambda of the inlet of the DeNOx catalyst, temperature difference between the inlet and outlet of the DeNOx catalyst, and so on.

The exhaust gas mass flow detector 110 detects the mass flow of the exhaust gas passing through the exhaust pipe 20, the third temperature sensor 60 detects the inlet temperature of the DeNOx catalyst 40, and the fourth temperature sensor 65 detects the outlet temperature of the DeNOx catalyst 40.

The temperatures detected by the third temperature sensor 60 and the fourth temperature sensor 65 may be used to determine the temperature of the DeNOx catalyst 40 through predetermined calculation. At this time, stored characteristics of SOx according to the temperature may be used. However, the inlet temperature of the DeNOx catalyst 40 or the outlet temperature of the DeNOx catalyst 40 may be used as the temperature of the DeNOx catalyst 40.

The first oxygen sensor 25 detects the lambda of the outlet of the engine 10. The intake mass flow detector 120 is mounted at an intake pipe and detects the mass flow of an intake air during one cycle.

The reducing agent injection amount detector 130 detects the current injection amount of the reducing agent. Because the injection amount of the reducing agent is duty-controlled by the control portion 50, the current injection amount of the reducing agent can be detected by reading a current duty value. In addition, the control portion 50 may estimate the mass flow of the reducing agent from the injection amount of the reducing agent.

The fuel injection amount detector 140 detects the fuel injection amount which is currently injected. Recently, the fuel is injected by a main injection and a pilot injection. Therefore, the fuel injection amount detector 140 detects the main injection amount and the pilot injection amount supplied to the combustion chamber 12 during one cycle. In addition, because the fuel injection amount is duty-controlled by the control portion 50, the current fuel injection amount can be detected by reading a current duty value.

The engine speed sensor 150 detects engine speed from a phase change of a crankshaft, and the third oxygen sensor 70 detects the lambda of the outlet of the DeNOx catalyst 40.

The control portion 50 determines the driving condition of the engine, the fuel injection amount, the fuel injection timing, the fuel injection pattern, the additional injection amount of the fuel (i.e., the injection amount of the reducing agent), the additional injection timing (i.e., the regeneration timing) and the additional injection pattern based on the detected values, and outputs a signal for controlling the first and second injectors 14 and 90. In addition, the control portion 50 controls the regeneration of the particulate filter 30 based on the detected values by the pressure difference sensor 55. As described above, the regeneration of the particulate filter 30 is performed by the post-injection of the first injector 14 or the additional injection of the second injector 90 or both. Further, the control portion 50 calculates the mass flow of SOx stored at the DeNOx catalyst 40 and the mass flow of SOx released from the DeNOx catalyst 40, and calculates the SOx amount stored at the DeNOx catalyst 40 and the SOx amount removed through desulfurization based thereon.

Besides the sensors shown in FIG. 2, it is to be understood an exemplary exhaust system of the internal combustion engine according to the present invention may include other sensors.

Figure 3:
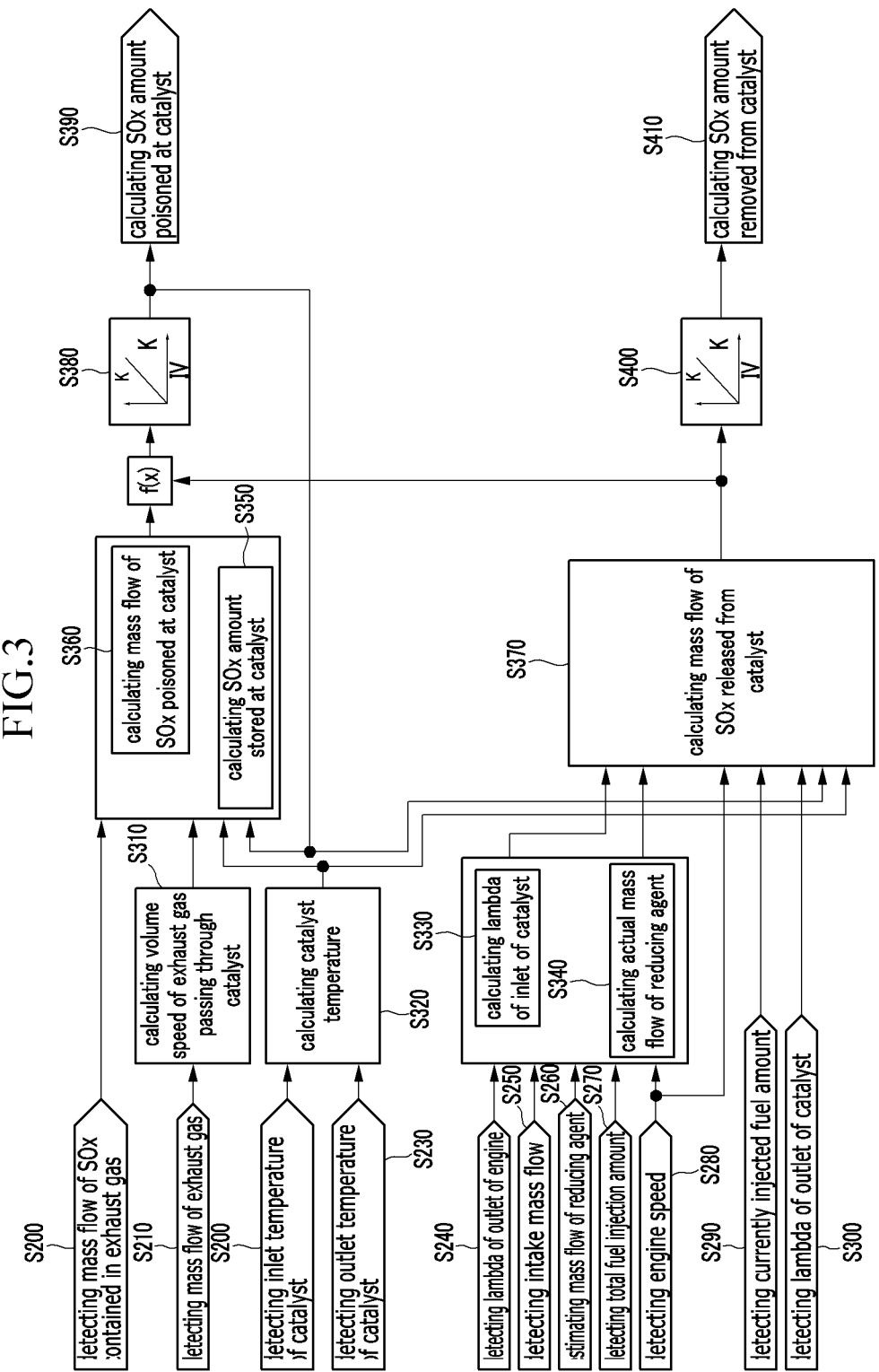
FIG. 3 is a flowchart of an exemplary method for predicting the SOx stored at a DeNOx catalyst according to the present invention.

A flowchart of an exemplary method is shown in FIG. 3 for predicting the SOx stored at an DeNOx catalyst according to the present invention. the SOx mass flow detector 100 detects the mass flow of SOx contained in the exhaust gas at the inlet of the DeNOx catalyst 40 at a step S200, the exhaust gas mass flow detector 110 detects the mass flow of the exhaust gas at a step S210, the third temperature sensor 60 detects the inlet temperature of the DeNOx catalyst 40 at a step S220, the fourth temperature sensor 65 detects the outlet temperature of the DeNOx catalyst 40 at a step S230, the first oxygen sensor 25 detects the lambda of the outlet of the engine at a step S240, and the intake mass flow detector 120 detects the intake mass flow at a step S250.

In addition, the reducing agent injection amount detector 130 detects the reducing agent amount injected into the exhaust gas, and the control portion 50 estimates the mass flow of the reducing agent based on the injection amount of the reducing agent at a step S260.

In addition, the fuel injection amount detector 140 detects the total fuel injection amount by integrating the detected fuel injection amount at a step S270, the engine speed sensor 150 detects the engine speed at a step S280, the fuel injection amount detector 140 detects the fuel amount which is currently injected at a step S290, and the third oxygen sensor 70 detects the lambda of the outlet of the DeNOx catalyst 40 at a step S300.

The control portion 50 calculates the volume speed of the exhaust gas passing through the DeNOx catalyst 40 based on the mass flow of the exhaust gas at a step S310. The volume speed of the exhaust gas is a factor that may impact the performance of exemplary embodiments of the present invention. However, there is some dissent about at what state the volume speed of the exhaust gas is calculated. It is known through various experiments that the volume speed of the exhaust gas calculated at a standard state may be suitable. The volume speed SV of the exhaust gas at the standard state may be calculated from Eq. (1).

$$SV = \frac{\dot{m}_{exh} \cdot R \cdot T_{std}}{P \cdot V_{cat}} \cdot 1000 \frac{1}{m^3} \qquad \text{Eq. (1)}$$

Herein, $\dot{m}_{exh}$ denotes the mass flow of the exhaust gas, R denotes the ideal gas constant, $T_{std}$ denotes the standard temperature of 298.15K, P denotes the standard pressure of 100000 Pa of the exhaust gas, and $V_{cat}$ denotes the volume of the catalyst.

The control portion 50 calculates the temperature of the DeNOx catalyst 40 based on the inlet temperature and the outlet temperature of the DeNOx catalyst 40 at a step S320.

In addition, the control portion 50 calculates the lambda of the inlet of the DeNOx catalyst 40 at a step S330, and calculates actual mass flow of the reducing agent at a step S340.

The lambda of the inlet of the DeNOx catalyst 40 is a factor for calculating the mass flow of SOx removed from the DeNOx catalyst 40. The lambda of the inlet of the DeNOx catalyst 40 can be detected by the second oxygen sensor 62. However, due to the inaccuracy and time delay of the second oxygen sensor 62, the lambda of the inlet of the DeNOx catalyst 40 may be calculated from Eq. (2).

$$\lambda_{Total} = \frac{\dot{m}_{Air}}{\dot{m}_{Fuel,total} \cdot L_{st}} = \frac{\dot{m}_{Air}}{(\dot{m}_{Fuel,external} + \dot{m}_{Fuel,internal}) \cdot L_{st}} \quad \text{Eq. (2)}$$

Herein, $\lambda_{Total}$ denotes the lambda of the inlet of the DeNOx catalyst, $\dot{m}_{Air}$ denotes the intake mass flow, $\dot{m}_{Fuel,total}$ denotes the total mass flow of the fuel (sum of the mass flow of the fuel and the mass flow of the reducing agent, $\dot{m}_{Fuel,internal}$ denotes the mass flow of the fuel, $\dot{m}_{Fuel,external}$ denotes the mass flow of the reducing agent, and $L_{st}$ denotes the stoicheiometric air/fuel ratio.

In addition, the mass flow of the fuel can be calculated from Eq. (3).

$$\dot{m}_{Fuel,internal} = q_{Fuel,internal} \cdot i \cdot z \cdot n \quad \text{Eq. (3)}$$

Herein, $q_{Fuel,internal}$ denotes the fuel injection amount, i denotes the number of combustion per one rotation of the cylinder, z denotes the number of the cylinders, and n denotes the engine speed. Substituting Eq. (3) to Eq. (2) leads to Eq. (4).

$$\lambda_{Total} = \frac{\dot{m}_{Air}}{(\dot{m}_{Fuel,external} + q_{Fuel,internal} \cdot i \cdot z \cdot n) \cdot L_{st}} \quad \text{Eq. (4)}$$

In addition, the lambda of the inlet of the DeNOx catalyst 40 can be calculated from Eq. (5).

$$\lambda_{Total} = \frac{\dot{m}_{Air}}{\dot{m}_{Fuel,total} \cdot L_{st}} = \frac{\dot{m}_{Air}}{\left(\frac{\dot{m}_{Air}}{\lambda_{internal} \cdot L_{st}} + \dot{m}_{Fuel,external}\right) \cdot L_{st}} = \frac{1}{\frac{1}{\lambda_{internal}} + \frac{\dot{m}_{Fuel,external} \cdot L_{st}}{\dot{m}_{Air}}} \quad \text{Eq. (5)}$$

Meanwhile, the actual mass flow $\dot{m}_{Fuel,reduction}$ of the reducing agent can be calculated from Eq. (6).

$$\dot{m}_{Fuel,reduction} = \dot{m}_{Fuel,total} \cdot (1 - \lambda_{total}) - \frac{\dot{m}_{Air}}{L_{st}} \cdot \left(\frac{1}{\lambda_{total}} - 1\right) \quad \text{Eq. (6)}$$

Herein, $\dot{m}_{Fuel,total}$ denotes the total mass flow of the fuel.

The control portion 50 calculates the SOx amount stored at the DeNOx catalyst 40 at a step S350, and calculates the mass flow of SOx poisoned at the DeNOx catalyst 40 based thereon at a step S360.

The SOx amount stored at the DeNOx catalyst 40 can be calculated from the SOx amount remaining at the DeNOx catalyst 40 and the SOx amount newly stored at the DeNOx catalyst 40 after previous regeneration.

Processes for calculating the mass flow of SOx stored at the DeNOx catalyst 40 will be described in detail with reference to FIG. 4.

Figure 4:
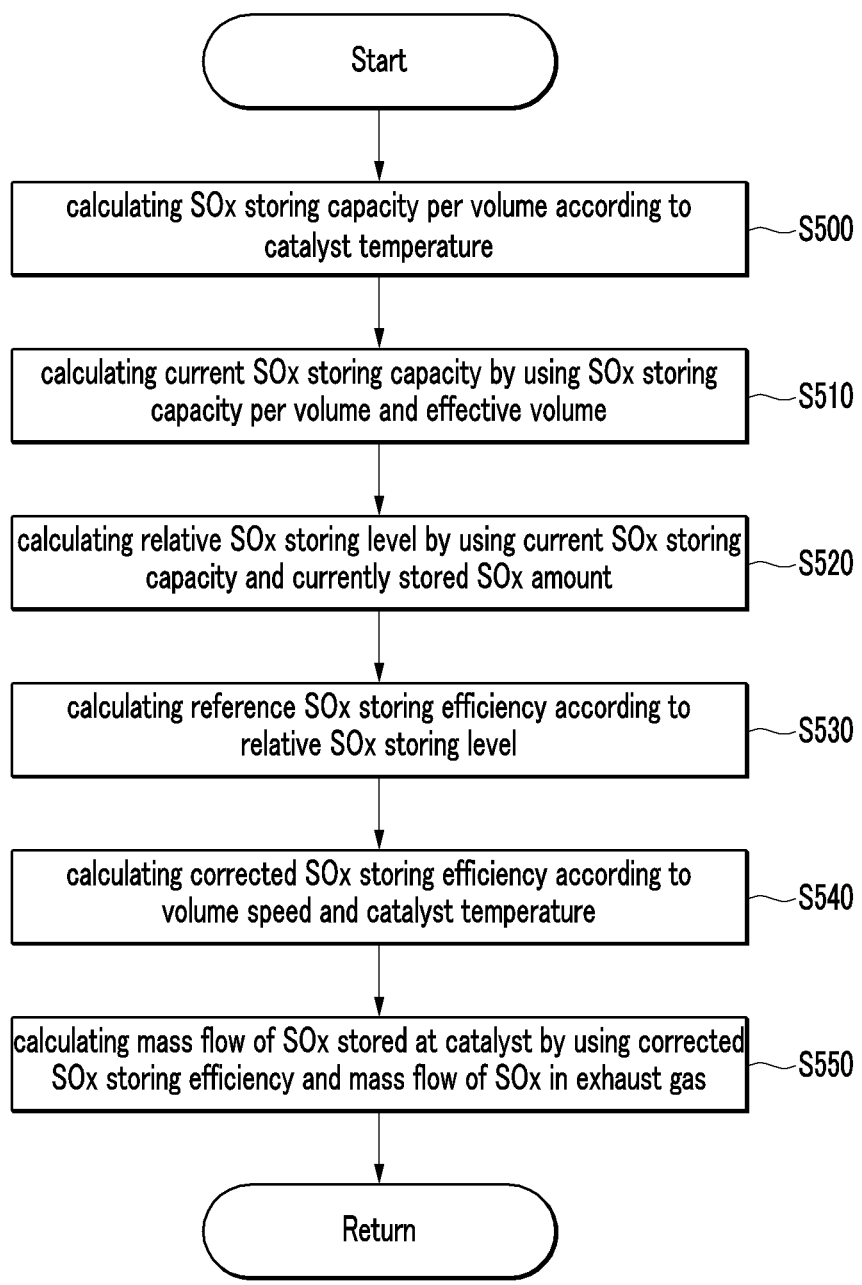
FIG. 4 is a flowchart for calculating the mass flow of SOx poisoned at a DeNOx catalyst according to an exemplary method of the present invention.

As shown in FIG. 4, the control portion 50 calculates the SOx storing capacity per volume according to the temperature of the DeNOx catalyst 40 at a step S500. The SOx storing capacity per volume according to the temperature of the DeNOx catalyst 40 may be stored at a predetermined map.

The control portion 50 calculates the current SOx storing capacity by using the SOx storing capacity per volume and an effective volume at a step S510.

After that, the control portion 50 calculates the relative SOx storing level by using the current SOx storing capacity and the currently stored SOx amount at a step S520. The relative SOx storing level can be calculated by dividing the currently stored SOx amount by the current SOx storing capacity.

The control portion 50 calculates the reference SOx storing efficiency according to the relative SOx storing level at a step S530. The reference SOx storing efficiency according to the relative SOx storing level may be stored at a predetermined map.

After that, the control portion 50 calculates the corrected SOx storing efficiency according to the volume speed of the exhaust gas and the temperature of the DeNOx catalyst 40 at a step S540. The correction coefficient according to the volume speed and the catalyst temperature may be stored at a predetermined map, and the control portion 50 may calculate the corrected SOx storing efficiency by multiplying the correction coefficient and the reference SOx storing efficiency.

After that, the control portion 50 calculates the mass flow of SOx stored at the DeNOx catalyst 40 by using the corrected SOx storing efficiency and the mass flow of SOx in the exhaust gas at a step S550. That is, the mass flow of SOx stored at the DeNOx catalyst 40 may be calculated by multiplying the corrected SOx storing efficiency and the mass flow of SOx in the exhaust gas.

Processes for calculating the mass flow of SOx released from the DeNOx catalyst 40 will be described in detail with reference to FIG. 5. The calculation may be performed at a step S370.

As shown in FIG. 5, the control portion 50 calculates the release efficiency by using the engine speed and the currently injected fuel amount at a step S600. The release efficiency according to the engine speed and current fuel injection amount may be stored at a predetermined map.

The control portion 50 calculates the reference SOx releasing mass flow by using the release efficiency and the mass flow of the reducing agent at a step S610. For example, the reference SOx releasing mass flow may be calculated by multiplying the release efficiency and the mass flow of the reducing agent.

After that, the control portion 50 calculates a first correction coefficient according to the lambda of the inlet of the DeNOx catalyst at a step S620, calculates a second correction coefficient according to the lambda of the outlet of the DeNOx catalyst at a step S630, and calculates a third correction coefficient according to the temperature of the DeNOx catalyst and currently poisoned SOx amount at a step S640.

After that, the control portion 50 calculates the mass flow of released SOx by using the reference SOx releasing mass flow and the first, second, and third correction coefficients at a step S370. For example, the mass flow of released SOx may be calculated by multiplying the reference SOx releasing mass flow and the first, second, and third correction coefficients.

Referring back to FIG. 3, the control portion 50 integrates a value obtained by subtracting the mass flow of SOx released from the DeNOx catalyst 40 from the mass flow of SOx poisoned at the DeNOx catalyst 40 at a step S380, and calculates the SOx amount poisoned at the DeNOx catalyst 40 at a step S390.

In addition, the control portion 50 integrates the mass flow of SOx released from the DeNOx catalyst 40 at a step S400, and calculates the SOx amount removed from the DeNOx catalyst 40 through desulfurization at a step S410.

As described above, since the SOx amount stored at a DeNOx catalyst can be precisely predicted, the desulfurization efficiency of an exhaust system may be improved according to the present invention.

Since the regeneration timing and the injection amount of reducing agents are controlled according to the precise SOx amount stored at the DeNOx catalyst, fuel economy may be improved.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust system comprising:
    an engine having a first injector injecting a fuel into a combustion chamber;
    an exhaust pipe through which an exhaust gas generated at the engine flows;
    a second injector mounted at the exhaust pipe and injecting a reducing agent;
    a DeNOx catalyst mounted at the exhaust pipe downstream of the second injector and reducing SOx or nitrogen oxides (NOx) or both contained in the exhaust gas by using the reducing agent injected by the second injector; and
    a controller electrically connecting the first injector, the second injector and the DeNox catalyst, and predicting a SOx amount stored at the DeNOx catalyst and a SOx amount removed from the DeNOx catalyst according to a driving state of the engine;
    wherein the controller calculates a mass flow of SOx poisoned at the DeNOx catalyst based on a mass flow of SOx in the exhaust gas, a volume speed of the exhaust gas passing through the DeNOx catalyst, a temperature of the DeNOx catalyst, and a currently stored SOx amount, and calculates a mass flow of SOx released from the DeNOx catalyst based on a lambda of an inlet of the DeNOx catalyst, an actual mass flow of the reducing agent, an engine speed, a current fuel injection amount, a lambda of an outlet of the DeNOx catalyst, the currently stored Sox amount, and the temperature of the DeNOx catalyst.

2. The exhaust system of claim 1, wherein the controller calculates a SOx amount poisoned at the DeNOx catalyst by integrating a value obtained by subtracting the mass flow of SOx released from the DeNOx catalyst from the mass flow of SOx poisoned at the DeNOx catalyst.

3. The exhaust system of claim 1, wherein the controller calculates the SOx amount removed from the DeNOx catalyst by integrating the mass flow of SOx released from the DeNOx catalyst.

4. The exhaust system of claim 1, wherein the controller calculates a SOx storing capacity per volume according to the temperature of the DeNOx catalyst, a current SOx storing capacity by using the SOx storing capacity per volume and an effective volume of the DeNOx catalyst, a relative SOx storing level by using the current SOx storing capacity and the currently stored SOx amount, a reference SOx storing efficiency according to the relative SOx storing level, and the mass flow of SOx stored at the DeNOx catalyst by using the reference SOx storing efficiency and the mass flow of SOx in the exhaust gas.

5. The exhaust system of claim 4, wherein the reference SOx storing efficiency is corrected according to the volume speed of the exhaust gas passing through the DeNOx catalyst and the temperature of the DeNOx catalyst.

6. The exhaust system of claim 1, wherein the controller calculates a release efficiency according to the engine speed and the current fuel injection amount, a reference SOx releasing mass flow by using the release efficiency and the actual mass flow of the reducing agent, and the mass flow of SOx released from the DeNOx catalyst by correcting the reference SOx releasing mass flow.

7. The exhaust system of claim 6, wherein the reference SOx releasing mass flow is corrected by using at least one of a first correction coefficient according to the lambda of the inlet of the DeNOx catalyst, a second correction coefficient according to the lambda of the outlet of the DeNOx catalyst, and a third correction coefficient according to the temperature of the DeNOx catalyst and the currently stored Sox amount.

8. The exhaust system of claim 1, wherein the reducing agent is the fuel; and
    wherein the exhaust system further comprises a fuel cracking catalyst disposed at the exhaust pipe between the second injector and the DeNOx catalyst and decomposing the fuel.

* * * * *